(12) United States Patent
Park et al.

(10) Patent No.: US 10,079,741 B2
(45) Date of Patent: Sep. 18, 2018

(54) METHOD AND APPARATUS FOR RECEIVING REFERENCE SIGNAL IN WIRELESS COMMUNICATION SYSTEM

(71) Applicant: LG ELECTRONICS INC., Seoul (KR)

(72) Inventors: Hanjun Park, Seoul (KR); Yunjung Yi, Seoul (KR); Kijun Kim, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 14/958,741

(22) Filed: Dec. 3, 2015

(65) Prior Publication Data

US 2016/0165465 A1 Jun. 9, 2016

Related U.S. Application Data

(60) Provisional application No. 62/086,712, filed on Dec. 3, 2014, provisional application No. 62/109,565, filed on Jan. 29, 2015.

(51) Int. Cl.
*H04L 12/26* (2006.01)
*H04W 24/00* (2009.01)
*H04W 36/00* (2009.01)

(52) U.S. Cl.
CPC .......... *H04L 43/067* (2013.01); *H04W 24/00* (2013.01); *H04W 36/0061* (2013.01); *H04W 36/0083* (2013.01)

(58) Field of Classification Search
CPC ............... H04L 43/067; H04W 24/00; H04W 36/0061; H04W 36/0083
See application file for complete search history.

(56) References Cited

U.S. PATENT DOCUMENTS

| | | | |
|---|---|---|---|
| 7,050,412 B2 * | 5/2006 | Cave ..................... | H04L 41/147 370/252 |
| 8,797,966 B2 * | 8/2014 | Dinan ................... | H04L 5/0057 370/252 |
| 2013/0196603 A1 * | 8/2013 | Gheorghiu ........... | H04W 24/00 455/67.11 |

(Continued)

*Primary Examiner* — Habte Mered
(74) *Attorney, Agent, or Firm* — Birch, Stewart, Kolasch & Birch, LLP

(57) ABSTRACT

A method and apparatus for receiving a reference signal (RS) in a wireless communication system are disclosed. The method for performing radio resource measurement (RRM) measurement for one or more sub-bands contained in an entire system band in a wireless communication system, wherein the method is performed by a terminal configured to operate in only one sub-band at a specific time includes: receiving a sub-band list or pattern for the RRM measurement and information regarding a measurement timing or section from a serving cell; and performing the RRM measurement in a radio resource defined by the sub-band list or pattern and information regarding the measurement timing or section within a report period of the RRM measurement, and reporting a result of the RRM measurement to the serving cell. The sub-band list or pattern includes sub-band candidates usable as a dedicated sub-band for the terminal from among sub-bands of the entire system band.

10 Claims, 10 Drawing Sheets

(56) References Cited

U.S. PATENT DOCUMENTS

| | | | |
|---|---|---|---|
| 2014/0094162 A1* | 4/2014 | Heo | H04W 52/0258 |
| | | | 455/422.1 |
| 2015/0208263 A1* | 7/2015 | Behravan | H04B 7/024 |
| | | | 370/252 |
| 2016/0127936 A1* | 5/2016 | Chatterjee | H04B 7/0626 |
| | | | 370/252 |
| 2016/0316403 A1* | 10/2016 | Li | H04W 24/10 |
| 2017/0093544 A1* | 3/2017 | Kazmi | H04L 5/0051 |

* cited by examiner

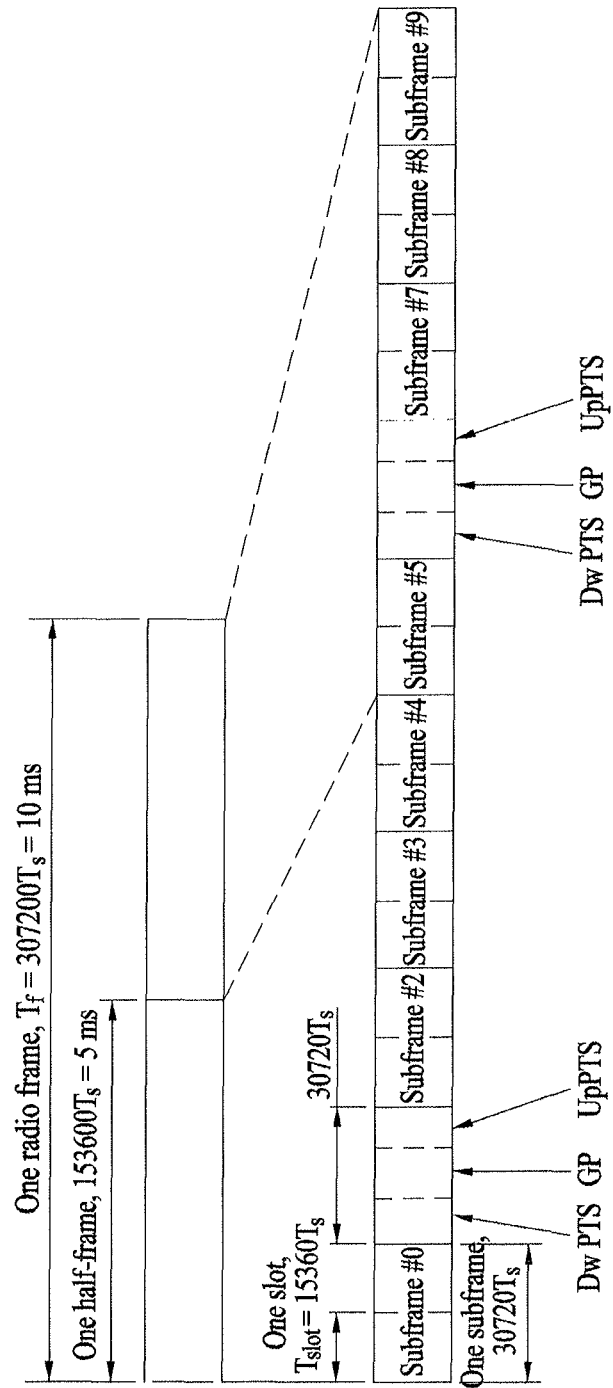

METHOD AND APPARATUS FOR RECEIVING REFERENCE SIGNAL IN WIRELESS COMMUNICATION SYSTEM

Pursuant to 35 U.S.C. § 119(e), this application claims the benefit of U.S. Provisional Application Nos. 62/086,712, filed on Dec. 3, 2014 and 62/109,565, filed on Jan. 29, 2015, which are hereby incorporated by reference as if fully set forth herein.

BACKGROUND OF THE INVENTION

Field of the Invention

The present invention relates to a wireless communication system, and more particularly to a method and apparatus for receiving a reference signal (RS) in a wireless communication system.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method for receiving a reference signal (RS) in a wireless communication system and operations associated with the same method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing radio resource measurement (RRM) measurement for one or more sub-bands contained in an entire system band in a wireless communication system, wherein the method is performed by a terminal configured to operate in only one sub-band at a specific time includes: receiving a sub-band list or pattern for the RRM measurement and information regarding a measurement timing or section from a serving cell; and performing the RRM measurement in a radio resource defined by the sub-band list or pattern and information regarding the measurement time or section within a report period of the RRM measurement, and reporting a result of the RRM measurement to the serving cell, wherein the sub-band list or pattern includes sub-band candidates usable as a dedicated sub-band for the terminal from among sub-bands of the entire system band.

Alternatively or additionally, the RRM measurement result may include RRM measurement results for each of sub-bands corresponding to the radio resource.

Alternatively or additionally, the RRM measurement result may include a single RRM measurement result for sub-bands corresponding to the radio resource.

Alternatively or additionally, the method may further include: receiving configuration for performing radio resource measurement (RRM) measurement for one or more sub-bands.

Alternatively or additionally, the method may further include: if the sub-band list or pattern indicates a plurality of sub-bands, reporting only a result of RRM measurement associated with a sub-band which continuously has a valid measurement section of a predetermined length or discontinuously has a valid measurement section of a predetermined length, to the serving cell.

Alternatively or additionally, the method may further include: transmitting an RRM measurement request for a neighbor cell to the serving cell to identify the neighbor cell.

Alternatively or additionally, the method may further include: if the RRM measurement request for the neighbor cell is approved, changing an operating frequency to a specific sub-band of the neighbor cell; performing RRM measurement in a specific sub-band of the neighbor cell during a predetermined time; and changing an operating frequency corresponding to a sub-band indicated by the sub-band list or pattern for the RRM measurement.

Alternatively or additionally, the approval of the RRM measurement request for the neighbor cell may be received through dynamic signaling.

Alternatively or additionally, the method may further include: receiving downlink data from the serving cell in at least one sub-band indicated by the sub-band pattern.

In accordance with another aspect of the present invention, a terminal configured to perform radio resource measurement (RRM) measurement for one or more sub-bands contained in an entire system band in a wireless communication system, wherein the terminal is configured to operate in only one sub-band at a specific time includes: a radio frequency (RF) unit; and a processor configured to control the RF unit, wherein the processor receives a sub-band list or pattern for the RRM measurement and information regarding a measurement timing or section from a serving cell; and performs the RRM measurement in a radio resource defined by the sub-band list or pattern and information regarding the measurement timing or section within a report period of the RRM measurement, and reporting a result of the RRM measurement to the serving cell. The sub-band list or pattern includes sub-band candidates usable as a dedicated sub-band for the terminal from among sub-bands of the entire system band.

Alternatively or additionally, the RRM measurement result may include RRM measurement result of each of sub-bands corresponding to the radio resource.

Alternatively or additionally, the RRM measurement result may include a single RRM measurement result for sub-bands corresponding to the radio resource.

Alternatively or additionally, the processor may be configured to receive configuration for performing radio resource measurement (RRM) measurement for one or more sub-band.

Alternatively or additionally, if the sub-band list or pattern indicates a plurality of sub-bands, the processor may report only a result of RRM measurement associated with a sub-band which continuously has a valid measurement section of a predetermined length or discontinuously has a valid measurement section of a predetermined length, to the serving cell.

Alternatively or additionally, the processor may be configured to transmit an RRM measurement request for a neighbor cell to the serving cell to identify the neighbor cell.

Alternatively or additionally, if the RRM measurement request for the neighbor cell is approved, the processor may change an operating frequency to a specific sub-band of the neighbor cell, performs RRM measurement in a specific sub-band of the neighbor cell during a predetermined time, and may change an operating frequency corresponding to a sub-band indicated by the sub-band list or pattern for the RRM measurement.

Alternatively or additionally, the approval of the RRM measurement request for the neighbor cell may be received through dynamic signaling.

Alternatively or additionally, the processor may receive downlink data from the serving cell in at least one sub-band indicated by the sub-band pattern.

It is to be understood that both the foregoing general description and the following detailed description of the present invention are exemplary and explanatory and are intended to provide further explanation of the invention as claimed.

As is apparent from the above description, the embodiments of the present invention can efficiently receive and measure a reference signal (RS) in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1A and 1B exemplarily show a radio frame structure for use in a wireless communication system.

DESCRIPTION OF SPECIFIC EMBODIMENTS

Figure 1A:
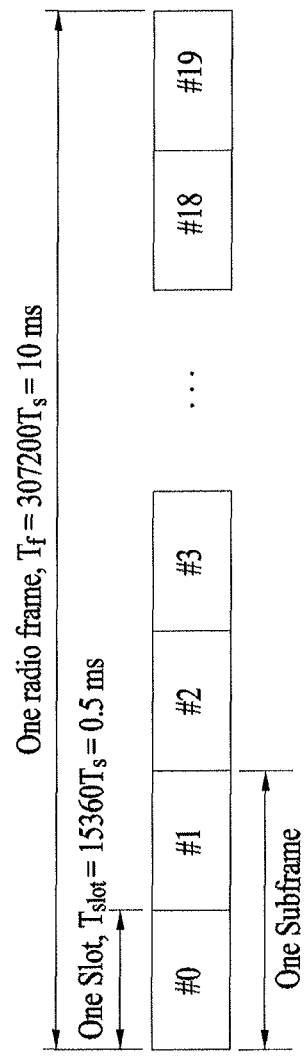

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information' with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIGS. 1A and 1B illustrate an exemplary radio frame structure used in a wireless communication system. FIG. 1A illustrates a frame structure for frequency division duplex (FDD) used in 3GPP LTE/LTE-A and FIG. 1B illustrates a frame structure for time division duplex (TDD) used in 3GPP LTE/LTE-A.

Referring to FIGS. 1A and 1B, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | | | $12800 \cdot T_s$ | | |
| 8 | $24144 \cdot T_s$ | — | — | — | — | — |
| 9 | $13168 \cdot T_s$ | — | — | — | — | — |

Figure 2:
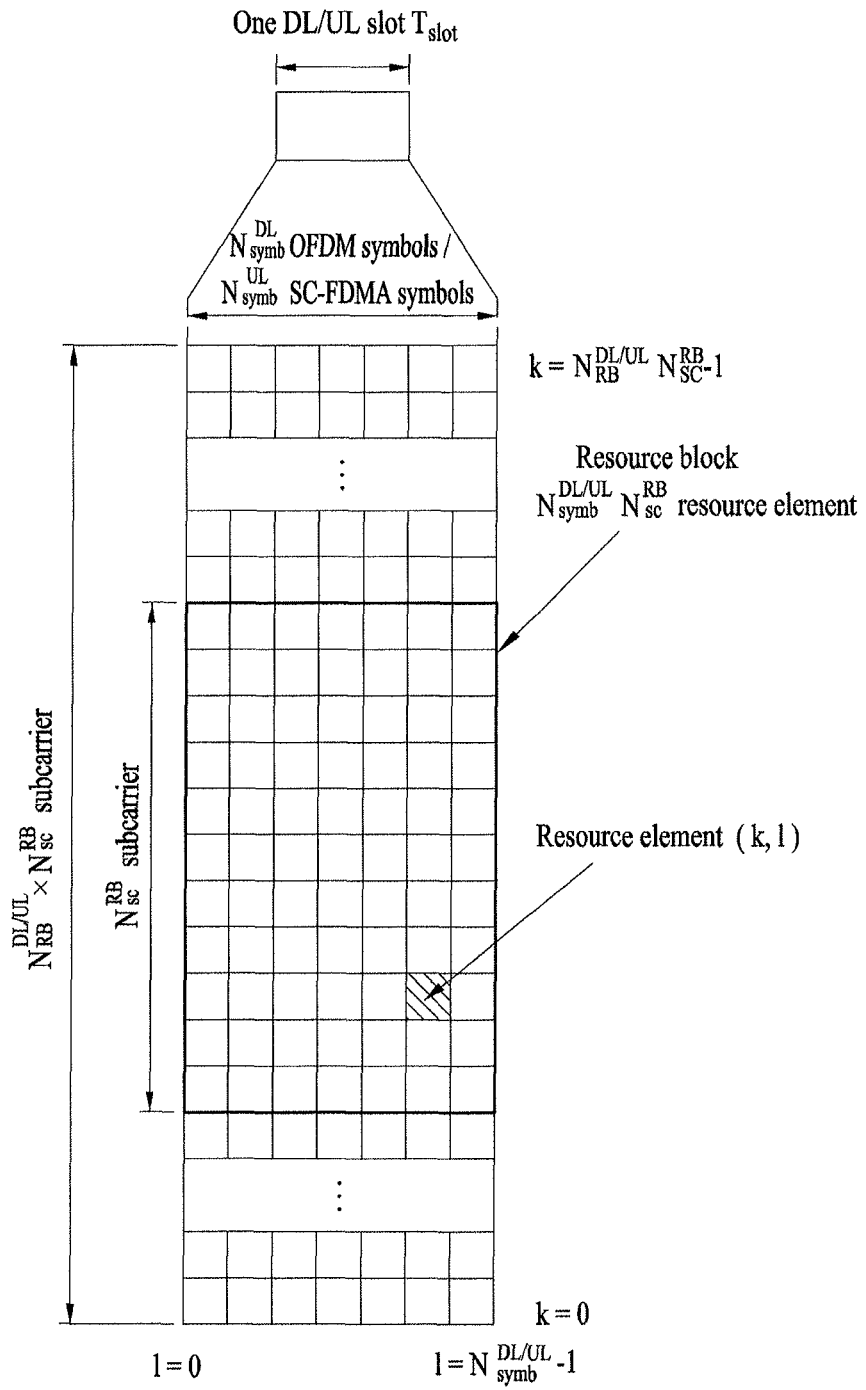
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
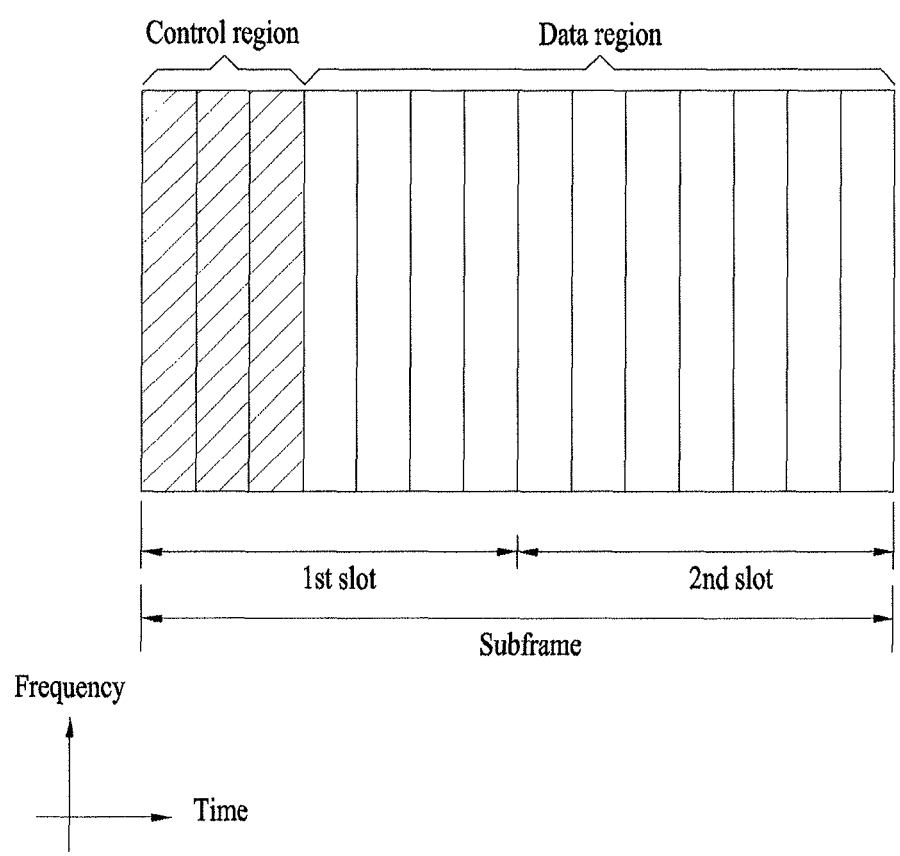
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE, aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
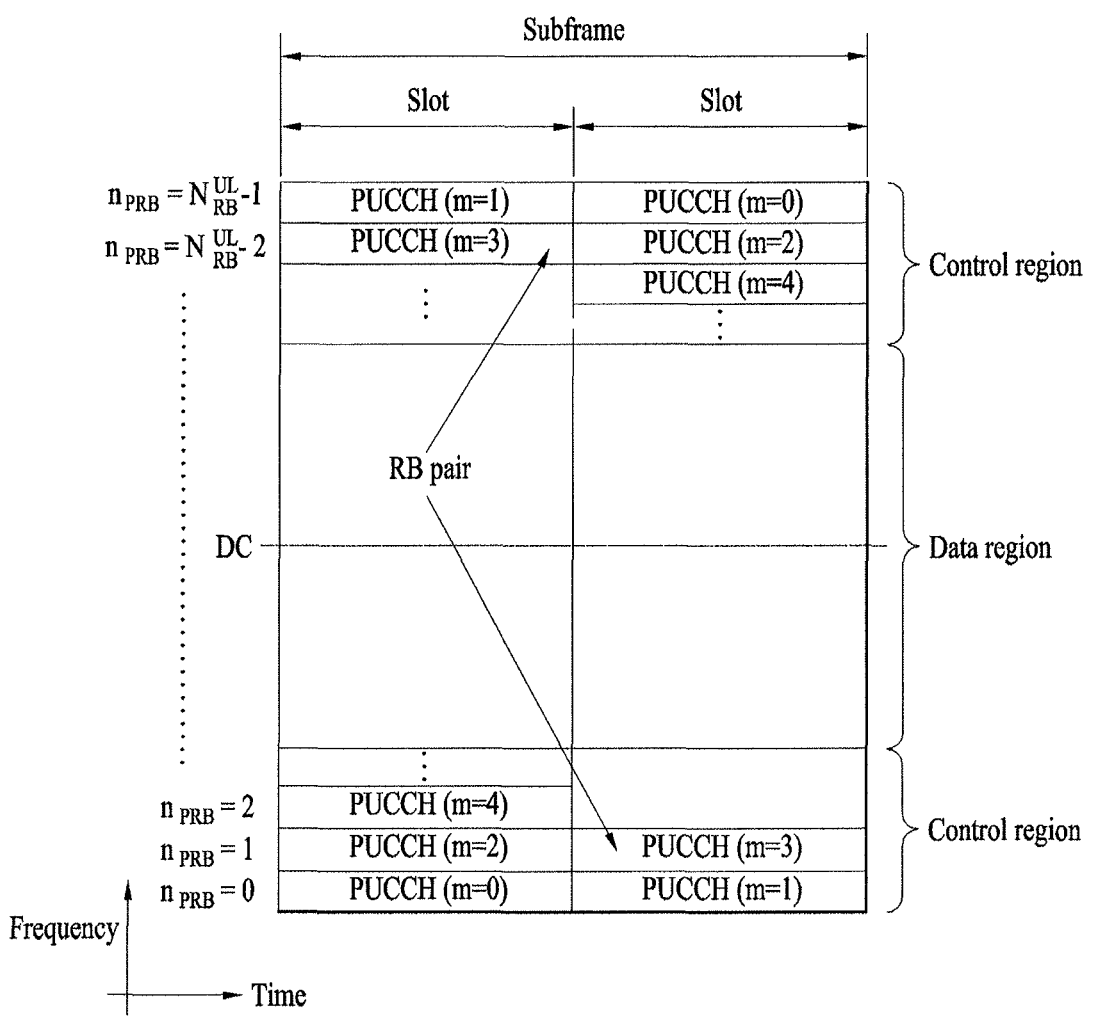
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In order to reduce costs and complexity, when a machine type communication (MTC) UE or a UE having an RF band smaller than the entire system RF band is present, the present invention proposes a Radio Resource Management (RRM) method in which reduced bandwidth characteristics of the MTC UE is considered.

The evolved wireless communication system such as LTE-A may support RRM operations including various functions, for example, power control, scheduling, cell search, cell re-selection, handover, radio link, connection monitoring, connection configuration/re-configuration, etc. In this case, the serving cell may request the RRM measurement information for the RRM operations from the user equipment (UE). For example, the user equipment (UE) may measure cell search information for each cell, reference signal received power (RSRP), reference signal received quality (RSRQ), etc., and may report the measurement result. For example, the UE may receive "measConfig" information as configuration information for RRM measurement from the serving cell. In this case, the UE may measure RSRP or RSRQ according to the "measConfig" information. In this case, RSRP and RSRQ based on 3GPP TS 36.214 can be defined as follows.

[RSRP Definition]

Reference signal received power (RSRP), is defined as the linear average over the power contributions (in [W]) of the resource elements that carry cell-specific reference signals within the considered measurement frequency bandwidth. For RSRP determination the cell-specific reference signals R0 shall be used. If the UE can reliably detect that R1 is available it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

[RSRQ Definition] (1): RSRQ

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

[RSRQ Definition] (2): RSSI

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

In accordance with the above-mentioned definition, the UE configured to operate in the LTE system may measure the RSRP through IE (information element)—associated with Allowed Measurement Bandwidth (AMB) transmitted in SIB3 (System Information Block Type 3) in the case of Intra-Frequency measurement, or may measure the RSRP at one bandwidth selected from among 6RB (Resource Block), 15RB, 25RB, 50RB, 75RB, 100RB through allowed measurement bandwidth (AMB) transmitted in SIBS in the case of Inter-frequency measurement. Alternatively, if the information element (IE) is not present, the UE configured to operate in the LTE system may measure the RSRP in a frequency bandwidth of the entire DL (downlink) system as a default.

In this case, if the UE receives the allowed measurement bandwidth, the UE may assume that the corresponding value is a maximum measurement bandwidth, such that the UE can freely measure the RSRP value within the corresponding value. However, if the serving cell transmits the IE defined as WB-RSRQ and establishes the allowed measurement bandwidth to SORB or higher, the UE must calculate the RSRP value regarding the entire allowed measurement bandwidth. Meanwhile, RSSI may be measured in the frequency bandwidth allocated to the receiver of the UE according to the RSSI bandwidth definition.

Meanwhile, the next-generation system such as LTE-A considers a method for constructing low-priced/low-specification UEs based on data communication, such as meter reading, water level measurement, surveillance camera use, reporting of stocked vending machines, etc. For convenience of description, the above UE will hereinafter be referred to as an MTC UE. The MTC UE has a small amount of Tx data and UL/DL data Tx/Rx occasionally occurs, such that reducing the UE cost and increasing battery lifespan according to a low data transfer rate is considered efficient. The LTE Rel-13 system is designed to have a small frequency bandwidth (for example, 1.4 MHz) for the UE operations so as to reduce the production costs of the MTC UE, such that RF/baseband complexity can be mitigated. In addition, in order to prevent performance (or throughput) deterioration based on the limited operation frequency bandwidth of the MTC UE, many developers and companies are conducting intensive research into a method for allowing the MTC UE to change the position of the UE operation frequency band (hereinafter referred to as an MTC region) through frequency retuning within the entire system bandwidth. For convenience of description and better understanding of the present invention, it is assumed that the UE has reduced bandwidth characteristics in the case in which the UE operation frequency bandwidth is limited.

A method for performing RRM measurement for the UE which has reduced bandwidth characteristics and is capable of changing the position of the UE operation frequency band within the entire system bandwidth will hereinafter be described.

[RRM Measurement]
(1) RRC Idle Mode
(1.1) Default Operation

In accordance with the embodiment, on the condition that the UE having the reduced bandwidth characteristics can change the position of the UE operation frequency band within the entire system band, a method for performing RRM measurement using a reference signal (RS) contained in a fixed sub-band having the same bandwidth (e.g., B0 Hz) as the UE operation frequency bandwidth on the basis of a specific frequency (f0) will hereinafter be described.

In order to perform RRM measurement by a user equipment (UE) for use in the system such as LTE, the UE may first perform the cell search process and the synchronization process for RSRP or RSRQ using synchronous signals (e.g., primary synchronization signal (PSS), primary synchronization signal (SSS), etc.) received from neighbor cells, and may measure RSRP or RSSI using a Cell Specific Reference Signal (CRS) of the corresponding cell according to the UE implementation scheme. If RSRP based on CSI-RS proposed in 3GPP LTE Rel-12 is used, RSRP based on CSI-RS or RSSI may be measured according to the UE implementation scheme. A discovery signal is periodically transmitted in a manner that this periodic transmission is beneficial to energy saving of the UE, such that the UE having reduced bandwidth characteristics may perform only measurement based on the discovery signal. Meanwhile, the LTE system may limit the synchronous signal within the fixed bandwidth (e.g., 1.4 MHz) on the basis of the intermediate frequency and then transmit the synchronous signal in such a manner that the UE for use in the LTE system can perform the cell search process without using information regarding the system bandwidth. The above operation will be maintained for legacy UEs, such that the method for allowing the UE having reduced bandwidth characteristics to perform RRM measurement of a specific cell within the 1.4 MHz bandwidth based on the intermediate frequency may be considered efficient. Therefore, the present invention proposes a method for controlling the above UE having reduced bandwidth characteristics to perform RRM measurement at a fixed sub-band having the B0 Hz bandwidth on the basis of the intermediate frequency (f0) for each frequency band, as a default operation for such RRM measurement. In this case, the UE having reduced bandwidth characteristics may assume that a minimum value from among the allowed measurement bandwidth and the operation frequency band (B0) is a maximum bandwidth for such measurement.

Figure 5:
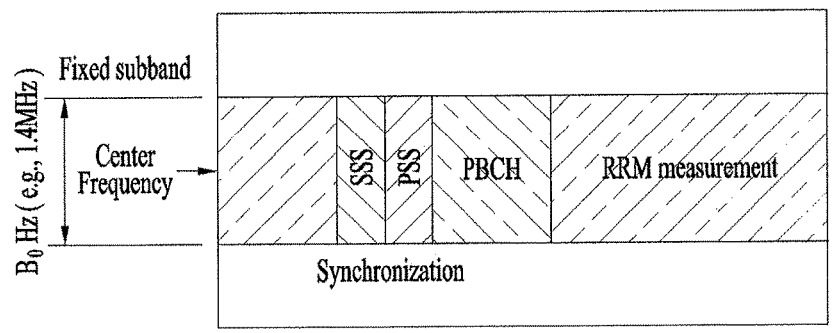
FIG. 5 is a conceptual diagram illustrating a method for performing RRM measurement at a fixed sub-band on the basis of an intermediate frequency (IF).

FIG. 5 is a conceptual diagram illustrating a method for performing RRM measurement at a fixed sub-band on the basis of an intermediate frequency (IF). In this case, the UE may perform synchronization with a target cell through a synchronization signal, and then perform RRM measurement using only a CRS contained in the fixed sub-band having a limited frequency bandwidth.

(1.2) RRM Measurement Based on the List of Sub-Bands

In accordance with the embodiment, when the UE having reduced bandwidth characteristics can change the position of its own operation frequency band within the entire system band, the cells may define the list of sub-bands supportable for the UE having reduced bandwidth characteristics as a default, or may pre-define the list of sub-bands on the basis of physical layer cell identifier (PCI). In addition, the UE may recognize the list of sub-bands for each cell during RRM measurement of each target cell to be measured, and a method for performing RRM measurement for each sub-band belonging to a union of all sub-band lists is proposed according to the embodiment of the present invention.

Figure 6:
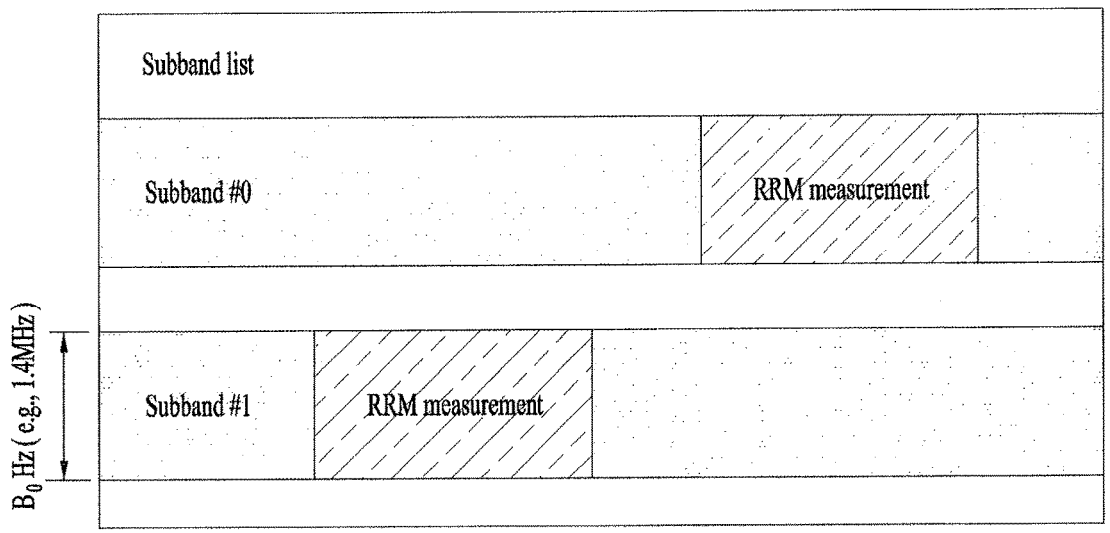
FIG. 6 exemplarily shows the list of sub-bands according to an embodiment of the present invention.

In 3GPP Rel-13 LTE, a method for transmitting not only a new control channel for the UE having reduced bandwidth characteristics but also the SIB has been used. As described above, assuming that signals dedicated only for the UE having reduced bandwidth characteristics are transmitted through the entire system bandwidth, this transmission may be undesirable in terms of resource efficiency, such that a method for employing the above-mentioned operation for only some sub-bands may be introduced. In this case, assuming that the UE can recognize information regarding the limited sub-band list in advance, the UE may not perform RRM measurement for each sub-band not to be supplied to the UE, such that RRM measurement can be more efficiently carried out. Therefore, according to the embodiment of the present invention, in order to allow the UE to recognize the list of sub-bands, the cells may define the list of sub-bands supportable for the UE having reduced bandwidth characteristics as a default, or may define the list of sub-bands on the basis of PCI acting as basic information, such that the UE can perform RRM measurement in consideration of the list of sub-bands of cells to be measured. In this case, each cell may select any one from among the default sub-band list and the sub-band list based on PCI of each cell, and may support the UE having reduced bandwidth characteristics. FIG. 6 exemplarily shows the list of sub-bands according to an embodiment of the present invention.

In this case, according to UE implementation methods, the UE having an RRC idle state may perform RRM measurement using a certain scheme contained in the sub-band list. Alternatively, the UE having the RRC idle state may perform measurement of a neighbor cell using a dedicated sub- and or the center 6RBs. In the case in which If the UE is configured to perform broadband RSRQ, a method for solving the above case is as follows.

Alt1: In the case in which performance signaling for allowing the UE to support broadband RSRQ is performed, if the broadband RSRQ is configured, the UE may support the broadband RSRQ. Otherwise, the UE may discard the corresponding configuration.

Alt2: In the case in which the UE does not support broadband RSRQ, the broadband RSRQ emulation is performed through hopping for each random sub-band such that the broadband RSRQ can be supported. In this case, the UE must perform measurement through several sub-bands through sub-band hopping, such that latency needed for measurement may be mitigated (or relaxed). For example, assuming that the broadband RSRQ can be measured through M sub-bands, the degree of the mitigated latency may be as much as M times the latency.

(2) RRC Connected Mode

The RRM measurement operation will hereinafter be described considering not only one case in which the UE receives a non-frequency hopping based unicast sub-band pattern for a sub-band for unicast reception (hereinafter referred to as a unicast sub-band) but also the other case in which the UE receives the frequency hopping based unicast subband pattern.

(2.1) Default RRM Measurement

In accordance with the embodiment, assuming that the UE having reduced bandwidth characteristics can change the UE operation frequency band within the entire system band, the following operations (a) and (b) can be performed.

(a) If the serving cell does not separately allocate the unicast sub-band pattern to the UE, the default unicast sub-band pattern in the time and frequency domains may be defined on the basis of a PCI of the serving cell or a time index (e.g., the slot or subframe index). If the UE does not receive a separate indication message for RRM measurement from the serving cell, the RRM measurement based on the default unicast sub-band pattern is performed and a single RRM measurement value is then reported. Alternatively, the UE may perform RRM measurement through the random hopping pattern in a plurality of sub-bands.

(b) Assuming that the serving cell separately allocates the unicast sub-band pattern to the UE, if the UE does not receive a separate indication message for RRM measurement from the serving cell, the UE may perform RRM measurement according to the unicast sub-band pattern currently allocated to the UE itself, and may report a single RRM measurement value. The unicast sub-band pattern may be applied whenever the UE performs measurement (for each frequency), and a specific time at which the UE is scheduled to perform such measurement may be dependent on the UE implementation.

If the UE does not receive a separate indication message from the corresponding serving cell at a specific time at which the UE performs initial access to a specific cell, specific UE information indicating a frequency axis to be used for the UE operation and a sub-band in which the UE will operate according to lapse of time needs to be predefined. If the UE changes the position of the frequency axis of the RF circuit at random, the serving cell does not recognize the position of the UE frequency axis, such that it is impossible for the serving cell to transmit any of indication messages to a desired object. Therefore, assuming that the UE selects a specific cell and performs initial access thereto, if the UE does not receive a separate indication message from the serving cell, the UE can change the operation frequency band according to the default unicast sub-band pattern predefined between the serving cell and the UE, and at the same time can perform RRM measurement, and as such a detailed description thereof will hereinafter be given. In this case, the unicast sub-band pattern may be set to any one of three patterns ((a), (b), (c)).

(a) A fixed sub-band based on an intermediate frequency (IF)

Figure 7:
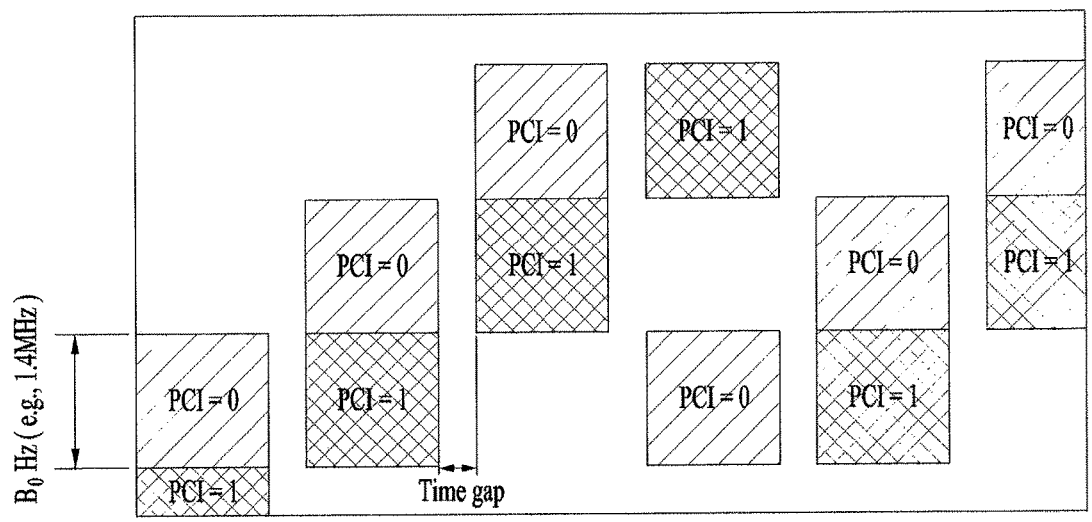
FIG. 7 exemplarily shows a sub-band pattern according to an embodiment of the present invention.

(b) A pre-defined pattern based on a time index of the serving cell (c) Cell-specific sub-band pattern based on PCI and time index of the serving cell (d) Random hopping pattern FIG. 7 shows an example for use in the case in which the unicast sub-band pattern is defined as shown in (c). In this case, the serving cell can recognize the position of a frequency axis based on the UE time, such that additional operations such as data transmission can be carried out.

As can be seen from FIG. 7, the sub-bands located in different frequencies contained in the sub-band pattern may have a constant time gap on the time axis, and the sub-bands may be designed in consideration of the retuning time of the MTC UE having reduced bandwidth characteristics.

Preferably, assuming that the unicast sub-band pattern allocated by the serving cell of the UE is present, the UE may perform RRM measurement within the corresponding sub-band pattern, and may report the single RRM measurement value. In other words, the UE may always perform RRM measurement within the sub-band to be monitored by the UE itself. Although the sub-band is changed to another, it is assumed that averaging is carried out. The operation for allowing the UE to perform measurement in a certain subframe may be changed by UE implementation.

(2.2) RRM Measurement for Each Sub-Band (2.2.1) Measurement Timing/the List of Sections and Subbands In accordance with the embodiment of the present invention, the UE having reduced bandwidth characteristics may change the position of an UE operation frequency band within the entire system band. Assuming that the UE receives a configuration message for execution of RRM measurement for each sub-band from the serving cell, the serving cell may semi-statically configure the list of sub-bands (each having the same bandwidth as the UE operation frequency band) and the measurement timing/section information, and the UE may perform RRM measurement for the sub-band list within a valid section according to the measurement timing/section definition within the RRM measurement report period, and then report the RRM measurement values for respective sub-bands.

In this case, assuming that the UE does not receive the sub-band list and the measurement timing/section configuration information from the serving cell, the UE may perform only RRM measurement and report the single RRM measurement value according to the unicast sub-band pattern allocated to the UE itself.

Figure 8:
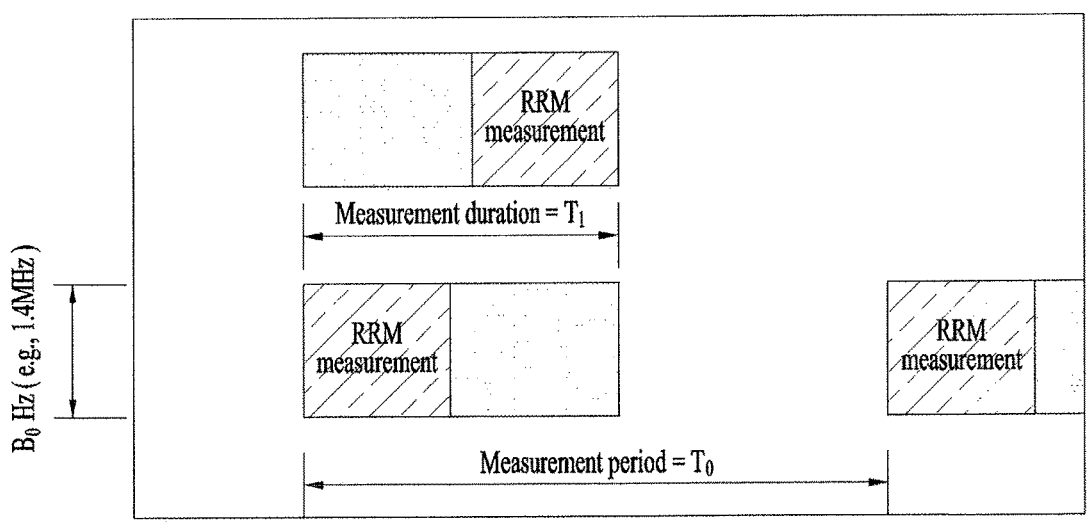
FIG. 8 exemplarily shows a measurement section and a measurement period according to an embodiment of the present invention.

In 3GPP Rel-13 LTE, introduction of the sub-band dedicated for the UE having reduced bandwidth characteristics has been considered. Assuming that the above-mentioned dedicated sub-bands are introduced and the UE receives a service for long-time data within a specific sub-band, it may be desirable that the RRM measurement for each sub-band be carried out. Therefore, according to the embodiment, the serving cell may semi-statically configure information regarding at least one sub-band and at least one measurement timing/section through higher layer signaling such as RRC, and may inform the UE having reduced bandwidth characteristics of the configured result. The UE may perform RRM measurement for each sub-band within the measurement timing/section. In this case, the sub-band list may be comprised of sub-band candidates capable of being used as the unicast sub-bands as necessary. The measurement time may be configured in the form of a measurement period on the time axis. FIG. 8 exemplarily illustrates that RRM measurement for two sub-bands configured by the serving cell is performed when a measurement period is denoted by T0 and the length of the measurement section is denoted by T1.

In this case, a measurement gap based on the frequency retuning may be added to both ends of the measurement section, and the operations within the measurement section may be based on UE implementation. For example, the UE may perform measurement for all sub-bands within the measurement section at a specific time, or may perform measurement for some sub-bands.

(2.2.2) Measurement Timing/Section and Sub-Band Pattern

In accordance with the embodiment, assuming that the UE having reduced bandwidth characteristics changes the position of the UE operation frequency band within the entire system band and receives a configuration message by which RRM measurement for sub-band will be performed from the serving cell, the serving cell explicitly describes and semi-statically configures the measurement timing/section information and the sub-band pattern applied in the corresponding measurement section, and the UE may perform RRM measurement according to the sub-band pattern within a valid section based on the measurement timing/section definition within the RRM measurement report period, and may report the RRM measurement values for respective sub-bands.

Although the above-mentioned operation (2.2.1) has clearly described that the serving cell informs the UE of only the measurement timing/section and the sub-band list so as to guarantee flexibility in UE implementation for convenience of description, the sub-band pattern for measurement within the measurement section may be additionally indicated as necessary. As a result, data may also be transmitted to the UE within the measurement section. For example, the hatched sub-band to be used for RRM measurement in FIG. 8 may be based on the sub-band pattern indicated by the serving cell. Alternatively, the sub-band pattern may be a default unicast sub-band pattern described in the operation (a) of the above section (2.1).

If the UE does not separately receive a configuration message indicating execution of RRM measurement for each sub-band from the serving cell in association with the above-mentioned operations (2.2.1) and (2.2.2), the UE may perform RRM measurement in the unicast sub-band allocated to the UE itself according to the default RRM measurement of the above operation (2.1), irrespective of specific information indicating whether the UE receives a configuration message indicating a specific unicast sub-band pattern or receives the unicast sub-band pattern to which frequency hopping is applied, and may then report the single RRM measurement value.

(2.3) RRM Measurement for Each Sub-Band in the Unicast Sub-Band Pattern Based on Frequency Hopping In accordance with the embodiment, assuming that the MTC UE having reduced bandwidth characteristics can change the position of UE operation frequency band within the entire system band, and receives an allocation message of the sub-band pattern based on the frequency hopping from the serving cell, when the serving cell transmits an indication message indicating execution of the RRM measurement for each sub-band to the UE, a predefined period (T0) may be present, such that the sub-band of a specific frequency position within the RRM measurement report period may continuously have the section (T0) (See (a)), or may perform RRM measurement within the corresponding sub-band only when the section (T0) is discontinuously achieved. In addition, performance requirements for RRM measurement in the legacy LTE system may be present. Although the UE can satisfy the above performance requirements within the given time, there is no limitation in UE implementation.

Figure 9:
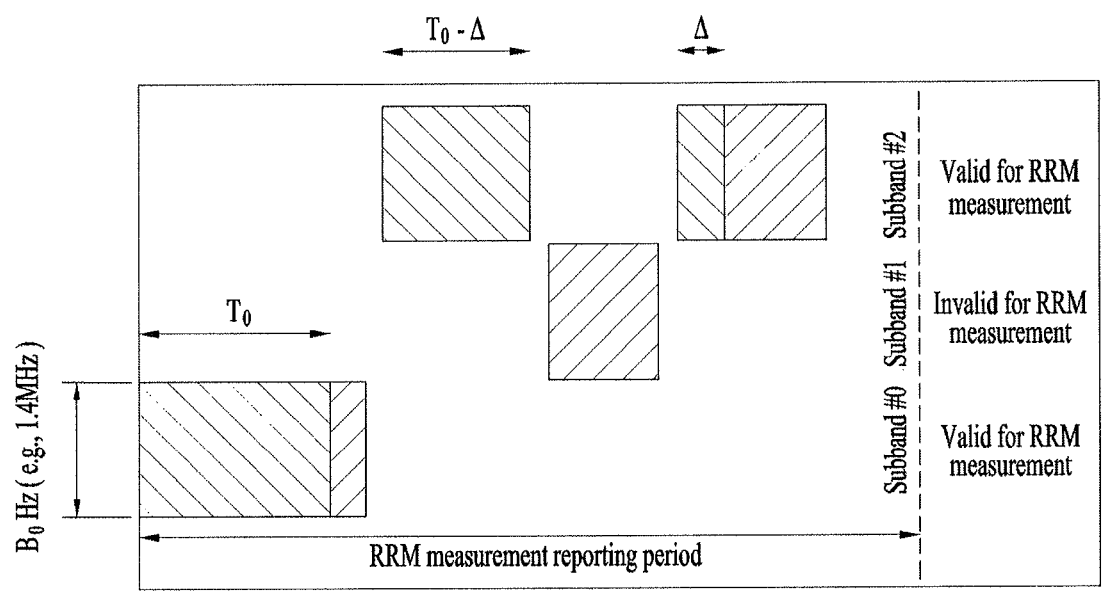
FIG. 9 illustrates validity of a measurement section according to an embodiment of the present invention.

Therefore, the embodiment of the present invention does not limit UE implementation as described above, and reflects introduction of the sub-band pattern and discontinuity of the measurement available section for each sub-band. As a result, RRM measurement for the corresponding sub-band can be carried out only when the sub-band of a specific frequency position continuously or discontinuously has the predefined section (T0) within the measurement report period. FIG. 9 shows an example of the above-mentioned operation.

In this case, assuming that a specific sub-band based on the sub-band pattern has at least the time (T0) within the RRM measurement report period, the measurement method for the corresponding sub-band may be dependent upon UE implementation.

In association with the above-mentioned operations (2.2) and (2.3), the serving cell may command the UE to perform any one of the following operations (a, b, c) through SIB or the like.

(a) Execution of single RRM measurement according to currently allocated unicast sub-band pattern (b) Execution of RRM measurement for each sub-band based on measurement timing/section (c) If frequency hopping is applied, RRM measurement based on the unicast sub-band pattern is carried out.

(2.4) Cell Identification and Synchronization (2.4.1) UE Based

In accordance with the embodiment, assuming that the UE having reduced bandwidth characteristics can change the position of the UE operation frequency band within the entire system band, if a reception process in a specific fixed sub-band to which the synchronous signal is transmitted is needed to identify a new cell during the RRM measurement process, retuning to the fixed sub-band through an uplink channel promised with the serving cell is carried out, measurement is carried out during the time (T0), and the operation for allowing the UE to return to the unicast sub-band pattern allocated to the UE itself is proposed.

When the UE having reduced bandwidth characteristics according to the embodiment performs the RRM measurement, the RRM measurement result for neighbor cells can be additionally obtained. In this case, the UE must receive the synchronous signal and system information from the neighbor cells, and the above signals are transmitted through the 1.4 MHz sub-band from the intermediate frequency (IF) in the LTE system. Therefore, for a detection process for neighbor cells to perform additional RRM measurement, the UE momentarily escapes from the legacy allocated unicast sub-band needed for data transmission, and must perform the cell identification process for the neighbor cell. In this case, a relatively long time (e.g., 800 ms) is needed for the above process, and the UE must operate in a specific fixed sub-band, such that unicast data transmission and the fixed sub-band is limited for long term, resulting in interference influence and resource inefficiency. Therefore, according to the embodiment, if the UE requests retuning at a specific time at which RRM measurement of a new cell is needed, if the serving cell approves the UE request through dynamic signaling (such as DCI (Downlink Control Information) or MAC signaling, measurement is performed at a fixed sub-band for a predetermined time (i.e., time T0), and the operation for allowing the UE to return to the unicast sub-band configured for the UE itself is proposed. In this case, a measurement gap based on the retuning operation may be present in the above process.

In this case, the UE may autonomously perform returning at a specific time at which each period returns in association with the period (T1) without receiving a separate request, and may inform the serving cell of the corresponding content through the promised uplink channel or the random access process. However, in this case, the time section (T1 or T0) may be limited in a manner that the above operation can less affect the data reception process.

Alt1: The UE capable of supporting the broadband RSRQ increases the RSRQ. If the UE does not increase the RSRQ, the corresponding configuration is discarded. Measurement for the subband to be monitored by the UE is performed, and the UE may report information regarding only such measurement.

Alt2: The UE incapable of supporting the broadband RSRQ can perform measurement for each sub-band in which measurement will be carried out, and can report the measurement result. In order to measure several sub-bands using the UE, the UE may configure the measurement gap or the measurement time, or the UE may use an autonomous gap as necessary. Alternatively, the UE may also perform measurement for only the sub-band scheduled to be monitored as necessary.

In the case of using the UE incapable of supporting the broadband RSRQ, the network may change the sub-band to be measured through dynamic signaling or semi-static signaling. In this case, the UE may perform measurement for only the corresponding sub-band, and then report the measurement result. In this case, if information regarding several sub-bands may be provided, and if information regarding several sub-bands is received or downloaded, the UE may measure the sub-band through the above-mentioned scheme.

(2.4.2) Base Station (BS) Based

In accordance with the embodiment of the present invention, when the UE having reduced bandwidth characteristics can change the position of the UE operation frequency band within the entire system band, the serving cell can periodically configure a constant measurement section in a manner that the UE can operate in a specific fixed sub-band in which the UE can perform cell identification and synchronization.

The LTE system according to the embodiment can support the radio resource management (RRM) operation to manage mobility. In the LTE system, two gap patterns (e.g., gap pattern ID '0' or '1') defined as a measurement gap (MG) or a measurement gap repetition period (MGRP) as the UE measurement performance needed to measure inter-frequency cells or each Radio Access Technology (RAT) cell are as follows.

TABLE 5

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

Figure 10:
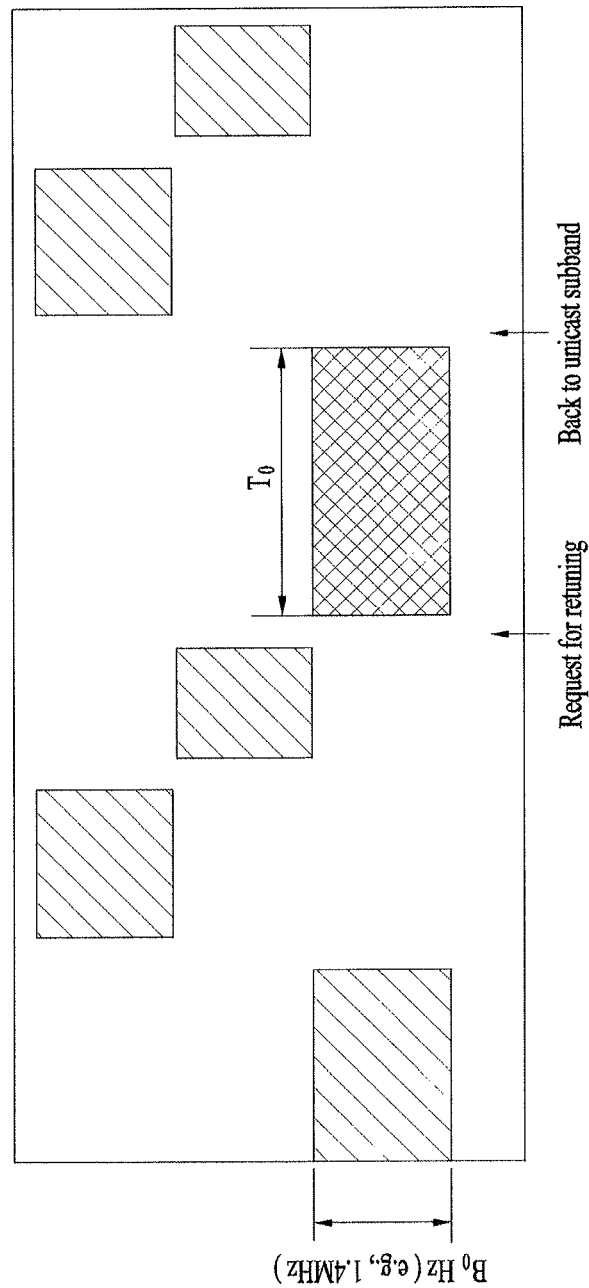
FIG. 10 is a conceptual diagram illustrating measurement based on sub-band hopping according to an embodiment of the present invention.

FIG. 10 exemplarily shows the above operation (2.4.1) when the UE having reduced bandwidth characteristics receives the unicast subband based on the frequency hopping.

A detailed description of the above-mentioned UE measurement operations is as follows.

If the broadband RSRQ is configured or the RSRQ regarding at least one sub-band is configured, the UE may perform the following operation.

Figure 11:
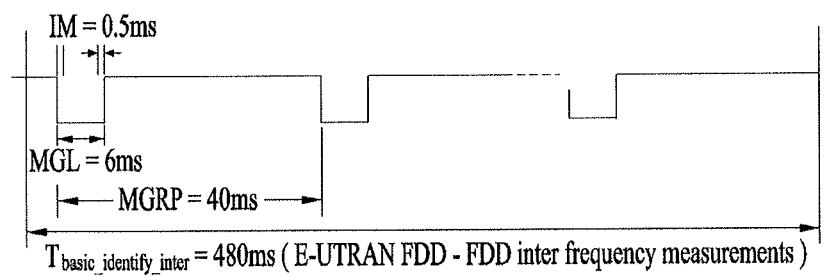
FIG. 11 exemplarily shows a measurement gap based on inter-frequency measurement.

FIG. 11 exemplarily shows the gap pattern ID (0) shown in the above Table 5 during the FDD-FDD inter-frequency measurement.

In FIG. 11, Implementation Margin (IM) may denote a time section in which the UE changes its own RF to another carrier frequency. When the UE measurement performance is defined as described above, it is expected that the BS will operate in MG as follows.

During the measurement gap (MG), the UE may not transmit any data, and will not receive tuning of its own receiver at carrier frequencies of PCell and SCell.

In this case, the UE may perform RRM measurement for each inter-frequency cell during the MG, and may perform RRM measurement for each cell contained in the frequency during the remaining regions other than the MG.

In the meantime, the LTE system according to the above embodiment may command the UE to detect each cell to be used for RRM measurement (e.g., RSRP (or RSRQ) measurement) within the time section defined as the ID time (i.e., $T_{identify}$), as well as to perform other RRM measurement (e.g., RSRP (or RSRQ) measurement) within the same time section as the ID time. The following Equation 1 shows definition of the above ID time.

$$T_{identify} = T_{basic\ identify} \cdot \frac{T_{measurement\ period}}{T_{min}} + \alpha \qquad [\text{Equation 1}]$$

In Equation 1, $T_{basic\ identify}$ may denote the length of a predetermined time section, $T_{measurement\ period}$ may denote the period in which RRM measurement is carried out, $T_{min}$ is a minimum available time needed for RRM measurement within the above time ($T_{measurement\ period}$), and α may denote a specific time added to the case in which the RRM measurement time is insufficient because of an excessively small number of DL subframes needed for TDD cell measurement. The above-mentioned values ($T_{basic\ identify}$, $T_{measurement\ period}$, $T_{min}$, α) may be designed as different values according to whether a target cell to be used for RRM measurement is an FDD or TDD cell, or according to a target cell is an intra-frequency cell present in the same frequency or an inter-frequency cell present in another frequency band.

Assuming that the UE having an RF frequency band smaller than the entire system RF frequency band is present to reduce costs and complexity by additional operations, if a measurement sub-band in which RRM measurement for each cell contained in a specific frequency is configured, and if the UE receives a PDSCH through the remaining sub-bands other than the above measurement sub-band, the UE and the BS may provide the following operations.

A. The UE may transmits a request message to the base station (BS) in such a manner that the BS can perform the inter-frequency measurement operation in association with the RRM measurement regarding the above intra-frequency cell upon receiving the request message. In this case, the inter-frequency measurement operation may include at least one of the following operations.

a. RRM measurement for the intra-frequency cell is carried out in MG.

b. The identification (ID) time ($T_{identify}$) for the intra-frequency cell may be calculated by the above values ($T_{basic\ identify}$, $T_{measurement\ period}$, $T_{min}$, α) to be used for inter-frequency cell measurement, and the RRM requirement for the above intra-frequency cell may be changed to the above value ($T_{identify}$) and then used.

c. When RRM measurement for the intra-frequency cell is reported to the serving cell of the UE, the UE may report the corresponding information according to the report period for the inter-frequency measurement.

B. The base station (BS) may transmit a response to the UE request shown in the above section (A).

C. the UE may perform the inter-frequency measurement in association with RRM measurement for the above intra-frequency cell according to the presence or absence of a response signal received from the BS.

In this case, the measurement sub-band between the BS and the UE may be promised as the intermediate 6RBs (or 1.4 MHz) through which PSS and SSS are transmitted. Alternatively, when the UE receives a PDSCH from the remaining sub-bands other than the measurement sub-band, the UE may apply the inter-frequency measurement operation to the RRM measurement for the intra-frequency cell without transmitting a separate request to the base station (BS).

Figure 12:
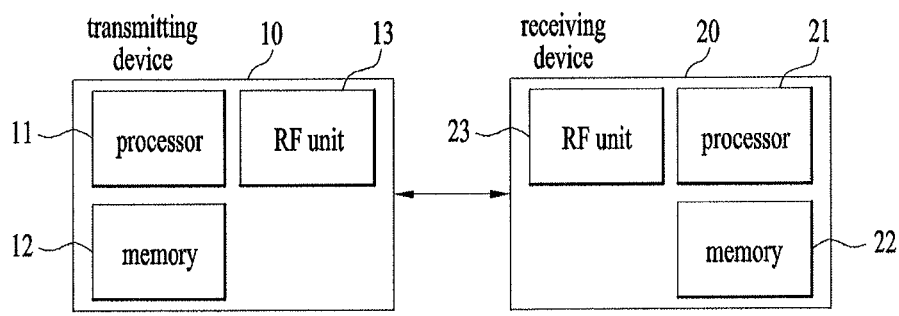
FIG. 12 is a block diagram of an apparatus for implementing embodiments of the present invention.

FIG. 12 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example; the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As is apparent from the above description, the embodiments of the present invention can efficiently receive and measure a reference signal (RS) in a wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing a radio resource measurement (RRM) measurement for one or more sub-bands contained in an entire system band in a wireless communication system, wherein the method is performed by a terminal configured to operate in only one sub-band at a specific time, the method comprising:

receiving a sub-band pattern for the RRM measurement and information regarding a measurement timing or a measurement section from a serving cell;

performing the RRM measurement in a sub-band of a first operating frequency in accordance with the sub-band pattern and the information regarding the measurement timing or the measurement section within a report period of the RRM measurement;

changing an operating frequency to a second operating frequency when the sub-band pattern indicates a frequency hopping-based sub-band pattern;

performing the RRM measurement in a sub-band of the second operating frequency in accordance with the sub-band pattern and the information regarding the measurement timing or the measurement section within the report period of the RRM measurement; and reporting results of the RRM measurement to the serving cell, wherein the sub-band pattern includes sub-band candidates usable as a dedicated sub-band for the terminal from among sub-bands of the entire system band, and wherein the RRM measurement is performed when the measurement section of each sub-band has a predetermined length either continuously or discontinuously within the report period of the RRM measurement.

2. The method according to claim 1, wherein the RRM measurement results include RRM measurement results for each of sub-bands corresponding to the radio resource.

3. The method according to claim 1, wherein the RRM measurement results include a single RRM measurement result for sub-bands corresponding to the radio resource.

4. The method according to claim 1, further comprising: receiving a configuration for RRM measurement for one or more sub-bands of the entire system band.

5. The method according to claim 1, further comprising: receiving downlink data from the serving cell in at least one sub-band indicated by the sub-band pattern.

6. A terminal configured to perform a radio resource measurement (RRM) measurement for one or more sub-bands contained in an entire system band in a wireless communication system, wherein the terminal is configured to operate in only one sub-band at a specific time, the terminal comprising:

a transceiver; and a processor configured to:

control the transceiver to receive a sub-band pattern for the RRM measurement and information regarding a measurement timing or a measurement section from a serving cell, perform the RRM measurement in a sub-band of a first operating frequency in accordance with the sub-band pattern and the information regarding the measurement timing or the measurement section within a report period of the RRM measurement, change an operating frequency to a second operating frequency when the sub-band pattern indicates a frequency hopping-based sub-band pattern, perform the RRM measurement in a sub-band of the second operating frequency in accordance with the sub-band pattern and the information regarding the measurement timing or the measurement section within the report period of the RRM measurement, and control the transceiver to report results of the RRM measurement to the serving cell, wherein the sub-band pattern includes sub-band candidates usable as a dedicated sub-band for the terminal from among sub-bands of the entire system band, and wherein the RRM measurement is performed when the measurement section of each sub-band has a predetermined length either continuously or discontinuously within the report period of the RRM measurement.

7. The terminal according to claim 6, wherein the RRM measurement results include RRM measurement results for each of sub-bands corresponding to the radio resource.

8. The terminal according to claim 6, wherein the RRM measurement results include a single RRM measurement result for sub-bands corresponding to the radio resource.

9. The terminal according to claim 6, wherein the processor is further configured to receive a configuration for RRM measurement for one or more sub-bands of the entire system band.

10. The terminal according to claim 6, wherein the processor receives downlink data from the serving cell in at least one sub-band indicated by the sub-band pattern.

* * * * *